US006657832B2

(12) United States Patent
Williams et al.

(10) Patent No.: US 6,657,832 B2
(45) Date of Patent: Dec. 2, 2003

(54) MECHANICALLY ASSISTED RESTORING FORCE SUPPORT FOR MICROMACHINED MEMBRANES

(75) Inventors: Bryon L. Williams, Plano, TX (US); Laurinda W. Ng, Plano, TX (US); Darius L. Crenshaw, Allen, TX (US); Jose L. Melendez, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 266 days.

(21) Appl. No.: 09/843,395

(22) Filed: Apr. 26, 2001

(65) Prior Publication Data

US 2002/0179421 A1 Dec. 5, 2002

(51) Int. Cl.[7] ................................................. H01G 2/12
(52) U.S. Cl. ......................... 361/15; 361/123; 200/181
(58) Field of Search ................... 361/15, 123; 200/181

(56) References Cited

U.S. PATENT DOCUMENTS 5,619,061 A     4/1997  Goldsmith et al.
6,307,452 B1 * 10/2001  Sun ............................. 333/262

OTHER PUBLICATIONS

Goldsmith, et al., Performance of Low–Loss RF MEMS Capacitive Switches, IEEE Microwave and Guided Wave Letters, Aug. 1998, vol. 8, No. 8, pp. 269–271.
Goldmsith, et al., Charateristics of Micromachined Swithces at Microwave Frequencies, IEEE MTT–S Digest, 1996, pp. 1141–1144.
Randall, et al., Fabrication of Micromechanical Switches for Routing Radio Frequency Signals, J. Vac. Sci. Technol. B 14(6), Nov./Dec. 1996, 1996 American Vacuum Society, pp. 3692–3696.
Tas, et al., Stiction in Surface Micromachining, MESA Research Institute, University of Twente, The Netherlands, Aug. 29, 1996, pp. 385–397.
Goldmsith, et al., Micromechanical Membrane Switches for Microwave Applications, 1995 IEEE MTT–S Digest, pp. 91–94.

* cited by examiner

Primary Examiner—Brian Sircus
Assistant Examiner—James A Demakis
(74) Attorney, Agent, or Firm—W. Daniel Swayze, Jr.; W. James Brady; Frederick J. Telecky, Jr.

(57) ABSTRACT

The present invention includes an integrated circuit switch including a membrane supported over a first conductor on a substrate, a conductive region on the membrane and connecting to the first conductor on the substrate, a pulldown electrode on the substrate and under the membrane and a pillar to support the membrane after the pulldown threshold has been reached. A voltage greater than a pulldown threshold is applied between the membrane and the pulldown electrode will pull the membrane down to make a capacitive coupling to the first conductor. The addition of the pillars increases the upward restoring force when the activation voltage is removed.

4 Claims, 3 Drawing Sheets

US 6,657,832 B2

MECHANICALLY ASSISTED RESTORING FORCE SUPPORT FOR MICROMACHINED MEMBRANES

FIELD OF THE INVENTION

The present invention relates generally to the field of micro-electromechanical switches, and, more particularly, to an apparatus and method for increasing the restoring force of a membrane particularly in the up direction.

BACKGROUND OF THE INVENTION

Developments in micro-electromechanical systems (MEMS) have facilitated exciting advancements in the field of sensors (accelerometers and pressure sensors), micro-machines (microsized pumps and motors) and control components (high-definition TV displays and spatial light modulators). In addition, the micro-mechanical switches have advantages prominent semiconductor and over switch technologies for the routing of microwave and millimeter-wave signals. The routing of microwaves and millimeter wave signals is typically accomplished with gallium arsenide field-effect-transistors (FET) or p-i-n diode switches. These solid state devices can integrate comfortably with other high frequency electronics with low power loss. A disadvantage is the slow switching speed. However, there are a number of applications that do not need the high switching speeds and are more sensitive either to the losses in the switches or the power consumed by the switches. For these applications, micromechanical switches may be an attractive alternative to solid state switches. Electrostatically activated micromechanical switches can provide switching with low insertion loss, high isolation, very low power consumption, and unmatched linearity.

Recent developments in MEMS technology have made possible the design and fabrication of control devices suitable for switching microwave signals. Electrostatically actuated cantilever switches have been used to switch low-frequency electrical signals. Since these switches have demonstrated useful performance at microwave frequencies using cantilever, rotary and membrane topologies, these switches have shown that moving metal contacts possess low parasitics at microwave frequencies due to their small size and are amendable to achieving low on-resistance (resistive switching) or high on-capacitance (capacitive switching). This results in switches with very low loss, electrostatic actuation (no DC current required) and a potential for ultra-linear small-signal operation.

Micromechanical switches may have an active element in a thin metallic membrane movable through the application of a DC electrostatic field. A cross-sectional view of a membrane switch element in the unactuated state is illustrated in FIG. 1. The upper contact of the switch includes a 0.3-$\mu$m or similarly sized aluminum membrane, suspended across polymer posts. Surface micromachining undercuts the post material from beneath the membrane, releasing it to be actuate. The suspended membrane typically resides 1-$\mu$m or similarly sized above the substrate surface. On the substrate surface, a bottom contact includes a 0.7-$\mu$m or similarly sized gold or aluminum first metal layer. On top of this first metal layer is positioned a thin dielectric layer, typically 1,000 Å or similarly sized layer of silicon nitride.

In the unactuated state, the membrane switch exhibits a high impedance due to the air gap between the bottom and top metal plates. Application of a DC potential between the upper and lower metal plates causes the thin upper membrane to deflect downwards due to the electrostatic attraction between the plates. When the applied potential exceeds the pull-in voltage of the switch, the membrane deflects into an actuated position. In this state, the top membrane rests directly on the dielectric layer and is capacitively coupled to the bottom plate. This capacitive coupling causes the switch to exhibit a low impedance between the two switch contacts. The ratio of the off- to on-impedances of the switch is determined by the on- and off-capacitances of the switch in the two switching states.

However, one of the problems with the device illustrated in FIG. 1 is that as this device cycles on and off, particularly at higher and higher frequencies, the device can get stuck with the membrane connected to the dielectric in the actuated state, leaving the device perpetually on. This is caused by the restoring force ($\overline{K}_{MEMBRANE}$) not being sufficiently strong enough to release the membrane from the surface of the dielectric due to striction forces that work against the restoring forces.

SUMMARY OF THE INVENTION

The present invention provides a MEMS switch that minimizes the problems associated with sticking of the membrane with the dielectric, and, more particularly, the present invention provides pillars or supports that effectively reduce the radius of the membrane when the membrane has been collapsed as in the actuated state while in the dielectric layer is capacitively coupled to the bottom plate. In contrast, when the switch is off and the membrane is separated from the bottom plate, the radius is not reduced but enlarged since there is no effect of these pillars in the unactivated state. This maintains the requirement for a low pull down.

DETAILED DESCRIPTION OF THE PRESENT INVENTION

The following invention is described with reference to figures in which similar or the same numbers present the same or similar elements. While the invention is described in terms for achieving the invention's objectives, it can be appreciated by those skilled in the art that variations may be accomplished in view of these teachings without deviation from the spirit or scope of the invention.

A lumped-element, one-dimensional model can be used to approximate the electromechanical motion of the switch of the present invention. This model approximates the switch as a single, rigid, parallel-plate capacitor suspended above the fixed ground plate by an ideal linear spring. It has a single degree of freedom, which is the gap between the top movable membrane and the bottom fixed plate. An important feature of this model is its ability to correctly predict the pull-in of the membrane as a function of applied voltage. The motion of this switch can be described by the pressure balance equation $$P(g) = K_S(g_0 - g) - \frac{\varepsilon_0 V^2}{2g^2}$$

where P is the total pressure on the mechanical body of the switch, g is the height of the switch body above the bottom plate, $g_0$ is the initial height of g with no applied field, and V is the applied electrostatic potential. The spring constant of the switch body, $K_S$, is determined by the Young's modulus and Poisson ratio of the membrane metal and the residual stress within the switch body. As the electrostatic field is applied to the switch, the top movable membrane having a conductive region starts to deflect downward, decreasing the gap g and increasing the electrostatic pressure on the membrane. At a critical gap height of approximately $\frac{2}{3} g_0$ this mechanical system goes unstable, causing the movable membrane to suddenly snap down or collapse onto the bottom plate.

The pulldown voltage $V_P$ for this device can be solved as $$V_P = \sqrt{\frac{8K_S g_0^3}{27\varepsilon_0}}$$

When the electrostatic pressure is removed from the switch, the tension in the metal top membrane pulls it back into the unactuated state.

The restoring force of the membrane is determined by the modulus (E), thickness (t), Poisson ratio (v), area ($\pi a^2$) and stress ($\sigma$) in the membrane as shown in Equation 1 for the circular membrane.

$$K_R = \frac{16Et^3}{3a^4(1-v^2)} + \frac{4\sigma t}{a^2} \quad \text{(Equation 1)}$$

These parameters effect the response of the device when going from the on state (membrane down) to off state (membrane up). Thus, the restoring force can be improved by using films with a high modulus or one that is relatively thick; however, this increases the pulldown voltage, which is proportional to $K^{1/2}$, since the restoring force acts as a resistive force which pulls the membrane down. This present invention seeks to somewhat decouple the restoring forces and therefore make the $K_{down} \ll K_{up}$.

Figure 1:
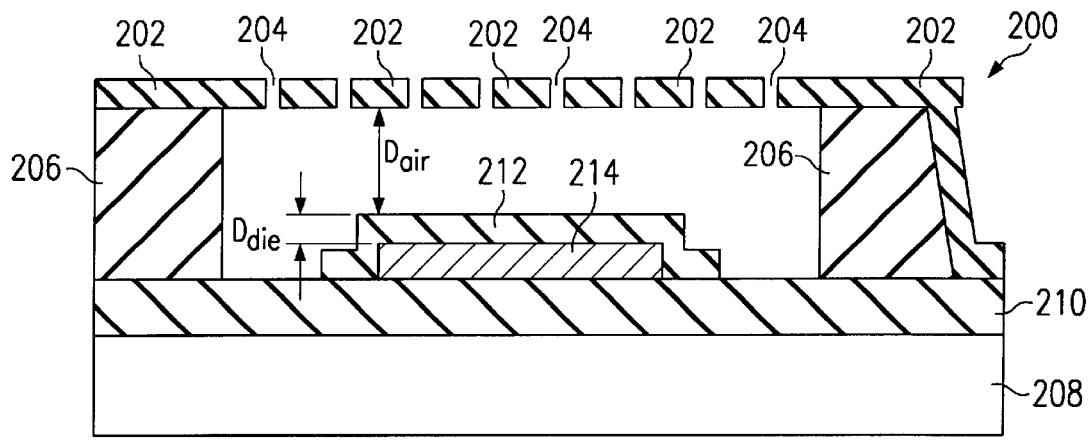
FIG. 1 illustrates the switch without the pillars.
Figure 2:
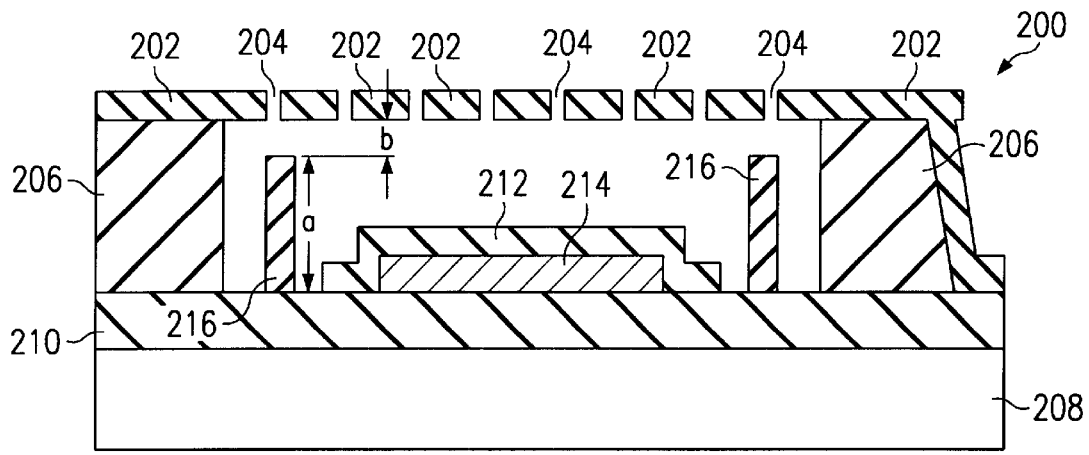
FIG. 2 illustrates the switch of the present invention in a first position with the pillars.

As illustrated in FIG. 2, a single-pole single-throw membrane switch 200 is illustrated. While a single-pole single-throw membrane switch 200 is illustrated, the principles are suitably applicable to other types of switches such as a single-pole double-throw membrane switch, a double-pole single-throw membrane switch, a double-pole double-throw membrane switch or higher-pole higher-throw membrane switches. The switch 200 includes a membrane 202 which covers the insulating spacer 206, the dielectric 212 and the poles 216. The insulating member 202 includes holes 204 to allow the spacer 206 to be removed. The insulating spacer 206 are illustrated on either side of dielectric 202; however, a three dimensional model would have the insulating spacer 206 completely covering the dielectric 212. The dielectric 212 prevents the membrane 202 from touching the electrode 214. The electrode 214 allows current to flow to the membrane. The insulator 210 insulates the substrate 208 from the electrode 214. The pillars 216 are positioned around the dielectric 212. The height of the pillars 216 is slightly less than the gap height $\frac{2}{3} g_0$ where the membrane becomes unstable causing the membrane to suddenly snap down onto the dielectric 212. The diameter of one of the pillars 216 is approximately 25 μm and could be varied. Positioned under the dielectric 212 is the bottom electrode 214 having a conductive region. The bottom electrode 214 is to accept the electrical signals from the membrane 202 when the membrane 202 approaches the dielectric 212 and the bottom electrode 214. The length a of pillar 216 is slightly less than $\frac{2}{3}$ of the total distance a+b between the insulator 210 and the top membrane 204.

Figure 3:
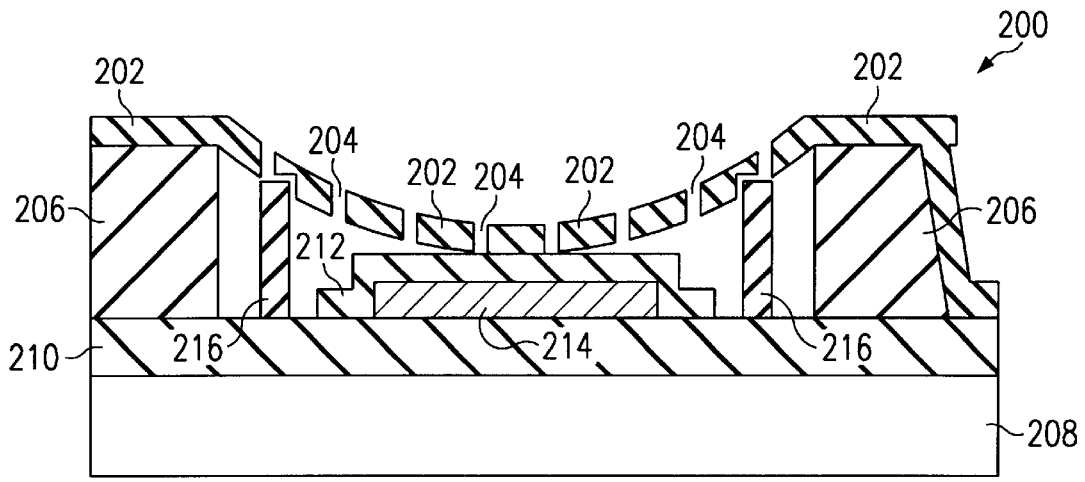
FIG. 3 illustrates the switch of the present invention in a second position with pillars.

FIG. 3 illustrates the same switch 200 but with the membrane positioned on the dielectric 212. The switch 200 is closed in this position.

Figure 4:
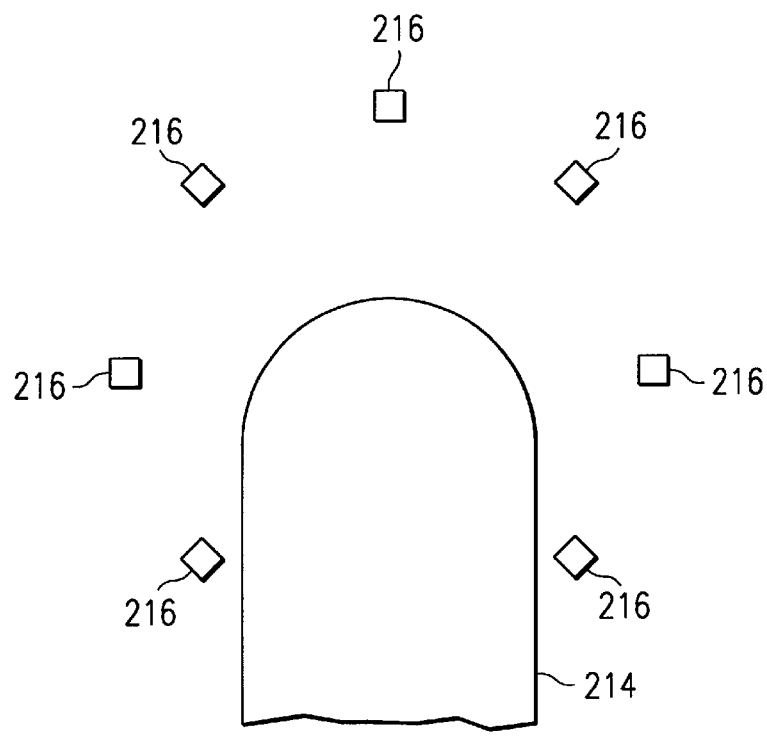
FIG. 4 illustrates an arrangement of the pillars for the switch of the present invention.
Figure 5A:
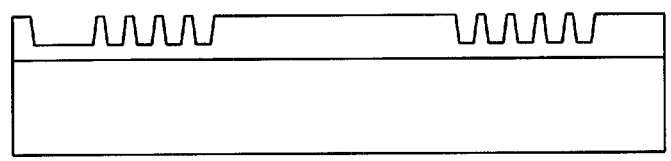
FIGS. 5($a$–$g$) illustrates a method for producing the present invention.
Figure 5B:
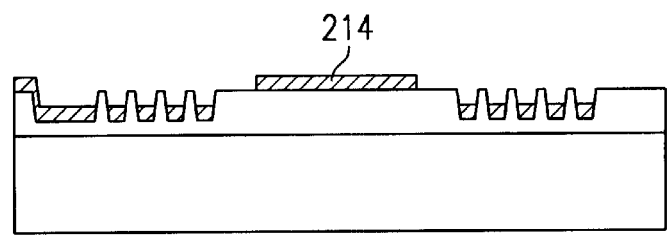
Figure 5C:
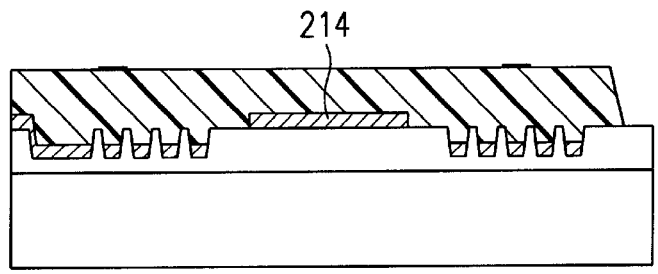
Figure 5D:
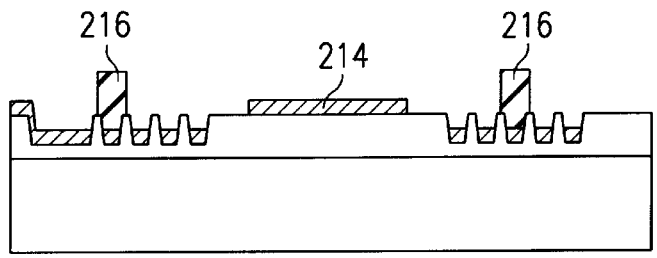
Figure 5E:
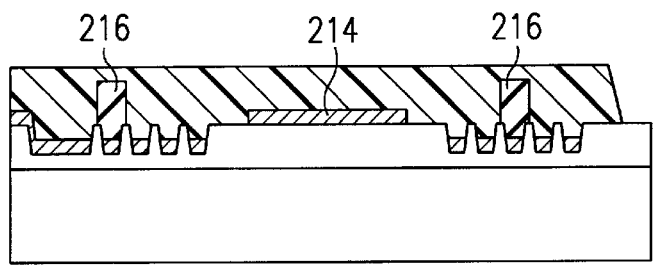
Figure 5F:
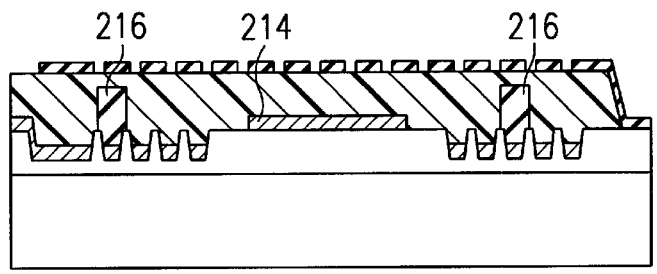
Figure 5G:
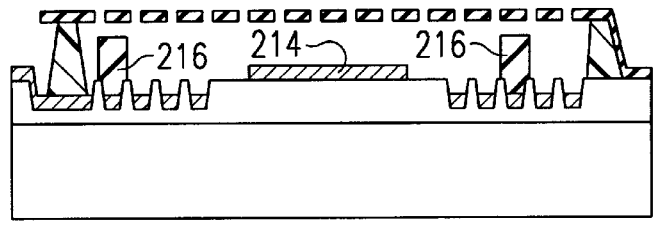

FIG. 4 illustrates the positioning of the pillars to support the membrane 202. The positions of the pillars (216) are arranged in a circle. A continuous band could be used instead of separate pillars.

FIG. 5 illustrates a method to produce the present invention but other methods could be used. As insulating layer 210 of $SiO_2$ is thermally grown on the substrate 208. The control electrode trench is lithographically defined and dry etched as shown in FIG. 5(a). A thin layer of aluminum is the deposited as illustrated FIG. 5(b). This first metal layer is patterned and etched to define both top and recessed metallization. The electrode 214 is correspondingly formed. A polymer layer is deposited, and the pillars 216 are patterned. The polymer is etched in FIG. 5(d) to be the pillars 216. In FIG. 5(e) a polymer spacer layer is deposited. The spacer layer is patterned and etched to define both top and recessed metallization in FIG. 5(f). The metallization is deposited and etched in FIG. 5(g) to define the top metal membrane and vias, and finally the unwanted spacer under the membrane is removed with a dry etch undercut.

Thus, the advantages of the present invention are achieved. The pillars 216 effectively reduce the radius of the membrane in the on state and, corresponding, as seen by the above equation, with a reduced membrane the restoring force is greater. The pillars 216 provide a focal point for flexing of the membrane 202 and reduces the membrane area that engages the bottom electrode. Thus, as clearly seen, the restoring force is related to the area of the membrane 202. However, it is important to remember that the insulating spacers 206 cannot be moved closer. The reason that the insulating spacers 206 cannot be moved closer is that it is necessary to remove all spacers on top of the dielectric 212. U.S. Pat. No. 5,619,061 is incorporated by reference in its entirety.

What is claimed is:

1. An integrated circuit switch, comprising:
    a membrane supported over a first conductor on a substrate;
    a conductive region on said membrane and connecting to said first conductor on said substrate;
    a pulldown electrode on said substrate and under said membrane; and
    a pillar to support said membrane only after a pulldown threshold has been reached,
    wherein a voltage greater than said pulldown threshold and applied between said membrane and said pulldown electrode will pull said membrane down to make a capacitive coupling to said first conductor,
    wherein said integrated circuit switch included a dielectric and, said pillar has a height less than $\frac{2}{3}$ the distance between the said membrane and said dielectric.

2. An integrated circuit switch as in claim 1, wherein said integrated circuit switch included a spacer under said membrane.

3. An integrated circuit switch as in claim 1, wherein said pillar is positioned between said dielectric and said spacer.

4. An integrated circuit switch as in claim 1, wherein said integrated circuit switch included a plurality of pillars arranged in an approximate circle.

* * * * *